3 Sheets--Sheet 2.

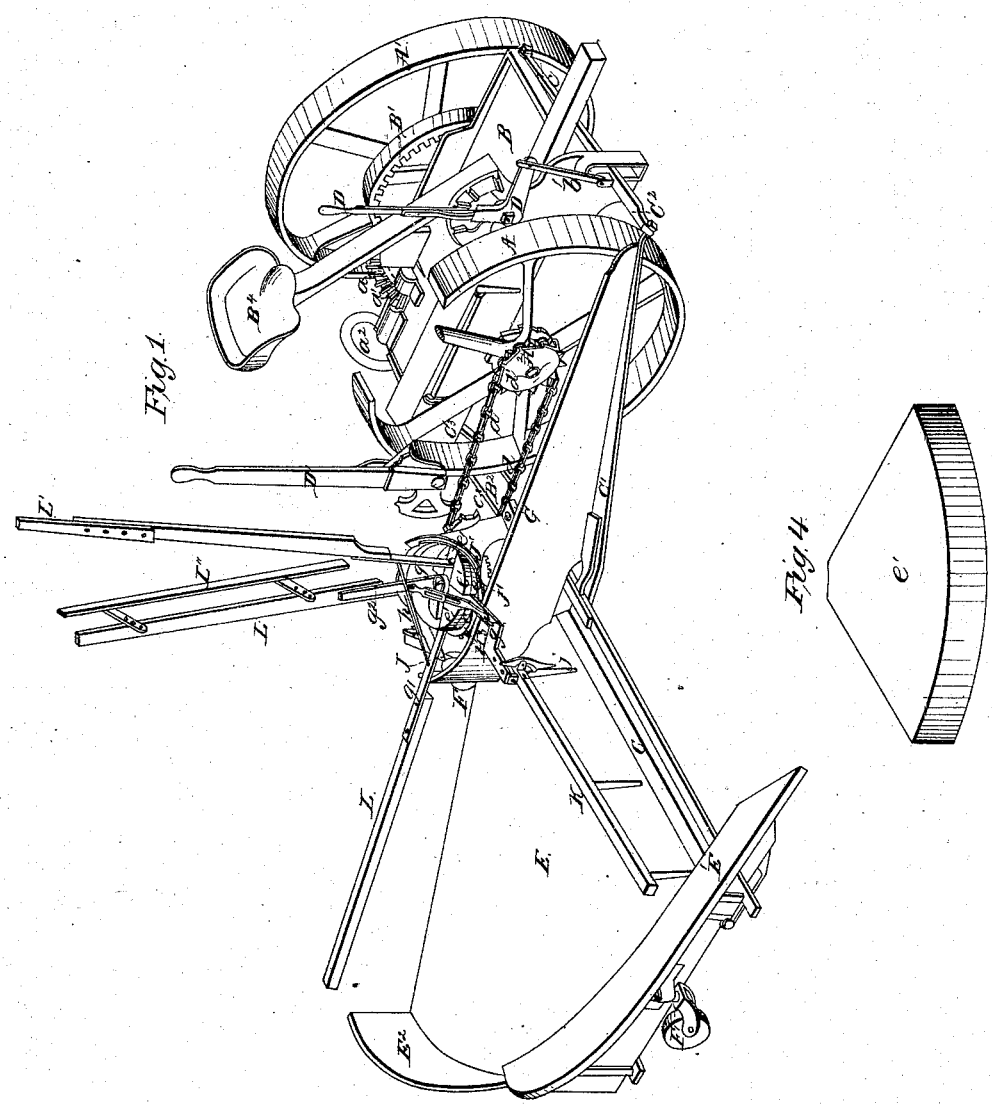

J. S. MARSH.
Harvester-Rakes.

No. 164,926. Patented June 29, 1875.

Attest:
R. S. Campbell.
Edw. Schafer.

Inventor:
James S. Marsh
by
Mason, Fenwick & Lawrence

THE GRAPHIC CO. PHOTO-LITH. 39 & 41 PARK PLACE, N.Y.

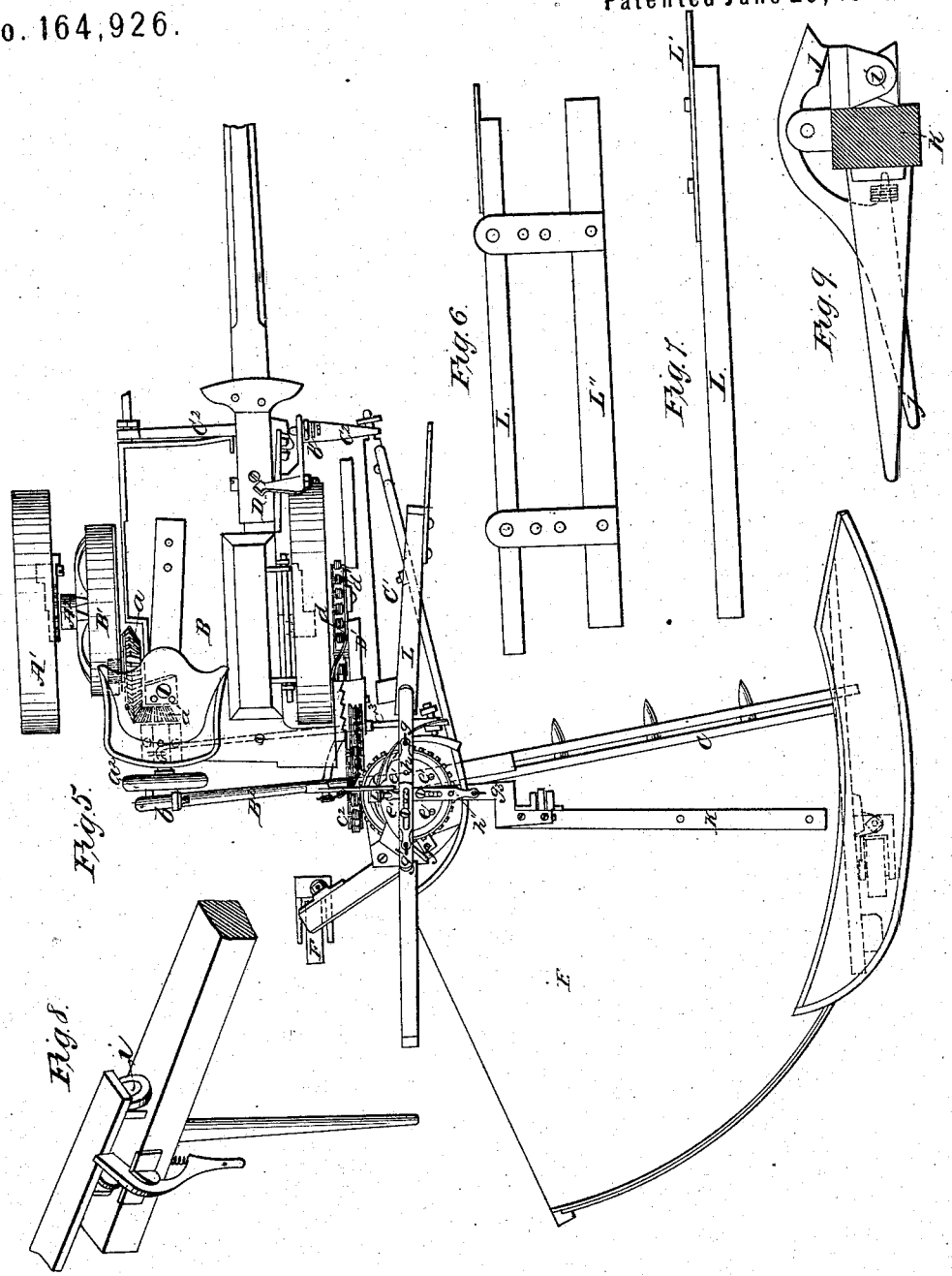

UNITED STATES PATENT OFFICE.

JAMES S. MARSH, OF LEWISBURG, PENNSYLVANIA.

IMPROVEMENT IN HARVESTER-RAKES.

Specification forming part of Letters Patent No. 164,926, dated June 29, 1875; application filed February 26, 1868.

*To all whom it may concern:*

Be it known that I, JAMES S. MARSH, of Lewisburg, in the county of Union and State of Pennsylvania, have invented certain new and useful Improvements in Reaping Machinery; and I do hereby declare that the following is a clear, full, and exact description thereof, reference being had to the accompanying drawings making a part of this specification, in which—

Figure 3:
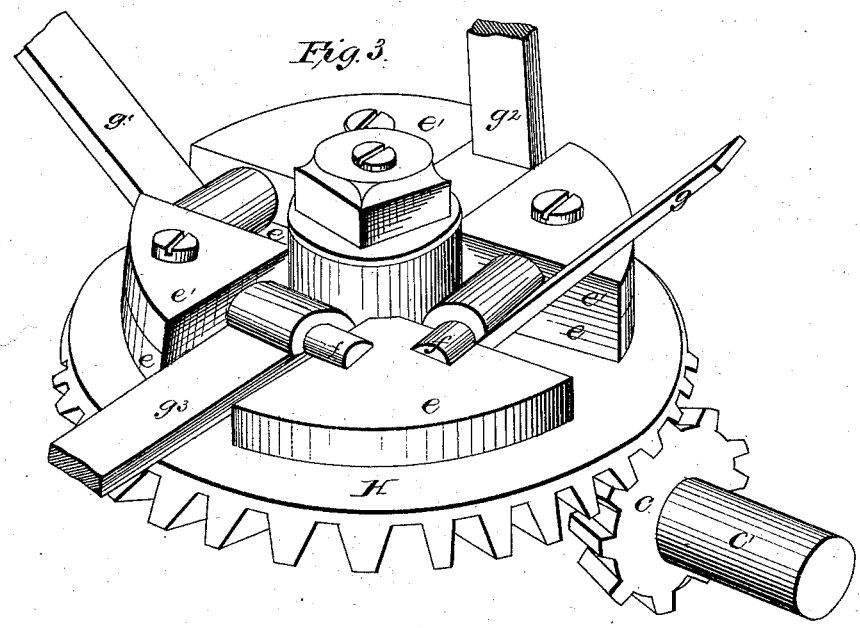
Figure 2:
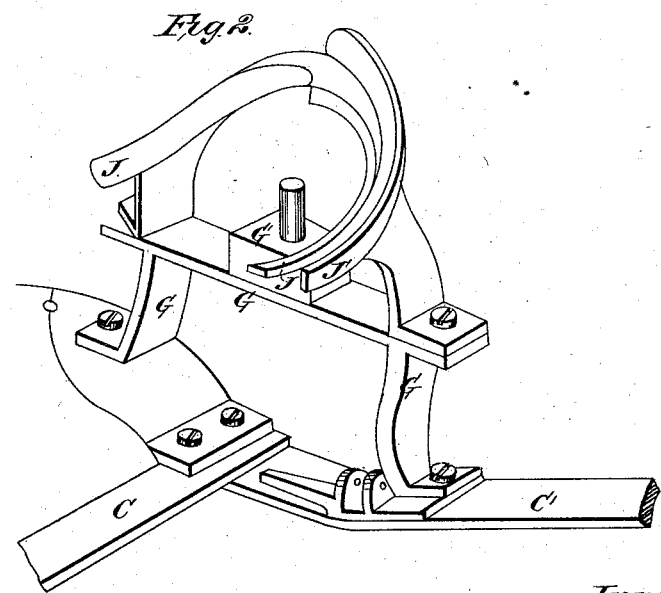

Figure 1 is a perspective view of the machine. Fig. 2 is a perspective view of the straddling standard for supporting the rake and beater arms. Fig. 3 is a perspective view of the crown-wheel, to which the rake and beater arms are pivoted. Fig. 4 is a perspective view of one of the segment-caps detached from the crown-wheel of Fig. 3. Fig. 5, Sheet 2, is a top view of the machine. Fig. 6 is a side view of one of the laterally-adjustable beater-arms. Fig. 7 is a side view of one of the longitudinally-adjustable beater-arms. Fig. 8 is a perspective view of one end of the rake, showing the manner of pivoting its head and securing the teeth either in a working position or out of such position. Fig. 9 is an enlarged end view of the rake and its latch.

Similar letters of reference indicate corresponding parts in the several figures.

This invention relates to certain novel improvements in, and also combinations of, machinery for gathering standing grain up to the sickle, and after it is cut delivering the grain from one side of the platform upon the ground in rear of the draft-carriage or inner drive-wheel.

To enable others skilled in the art to understand my invention, I will describe its construction and operation.

In the accompanying drawings, A A$^1$ represent two transporting-wheels, which are applied to an axle, A$^2$, by means of dogs and ratchet-wheels, so that when the machine is moved backward, the wheels will turn loosely around their axle, and when the machine is moved forward the axle will be caused to turn with the wheels. B is the platform, which is cast in one piece with the tool-box, strengthening-ribs, and flanges, and bearings for the shaft which transmits motion to the cutting apparatus. On the outer part of the axle A$^2$, near the wheel A$^1$, is an inside gear-wheel, B$^1$, keyed to said axle, which engages with the pinion-wheel on the shaft of the large bevel spur-wheel $a$. This wheel $a$ has its bearing upon a shaft projecting from the outer edge of the platform B, and engages with the teeth of a bevel-pinion, $a^1$, on a short longitudinal shaft, that carries a crank-wheel, $a^2$, on its rear end. To this crank-wheel the pitman-rod B$^2$ is connected by means of a chilled box, $b$, which is made in halves, and securely strapped upon a chilled wrist-pin, which latter is constructed with a ball on its end, fitting loosely into a socket in said box. The finger-bar C is rigidly secured at its inner end to the rear end of a drag-brace, C$^1$, which brace is curved so as to form a shoe, and extends forward and upward to a transverse arm, C$^2$, to the inner end of which said brace is pivoted. The outer end of the arm C$^2$ is pivoted to the front edge and near the outer corner of the platform B, and it is connected by a link or chain, $b'$, to the short arm of a right-angled lever, D, which is located within reach of the driver, who sits upon the seat B$^4$ on the platform B. By means of lever D the driver can adjust the front edge of the platform E up or down, according to the height of cut required.

The finger-bar is again attached to the platform B by means of an inclined transverse bar, C$^3$, which is pivoted at its upper and outer end, near the rear outer corner of the platform B, and at its inner end to the drag-brace C$^1$, in front of the finger-beam C. When the raking attachment and the platform B are removed, and the machine thus arranged for mowing, a lever, D$'$, which is attached by means of a chain to the bar C$^3$, may be used for lifting or depressing the finger-beam.

The platform E, which is of a segment form, is suitably secured to the finger-beam C, and provided with an outer or grain divider, E$^1$, a rear curved guard, E$^2$, and two supporting caster-wheels, F F$'$, which are so arranged that they serve as the fulcrums about which the platform and its cutting apparatus are adjusted when the lever D is vibrated. These caster-wheels are so applied that they admit of the cutting apparatus being adjusted alike at both ends. Both caster-wheels may be applied directly under the grain-platform, at opposite sides thereof.

G represents a casting, which is made somewhat in the form of a bridge or arch, with two legs that are united at their upper ends, as shown in Fig. 2. This portion G I shall term a straddling standard and brace for the raking apparatus, as one leg is secured rigidly to the platform E, and the other leg is secured to the drag-brace C$^1$, so as to form a stiffening-brace for the joint between the drag-bar and finger-beam and platform, and to allow the sickle and pitman to slide freely beneath it. On top of standard G a block, G', is cast, upon which the crown-wheel H is pivoted, so as to rotate freely around a central pin. The crown-wheel H is beveled and provided with teeth, which engage with the teeth of a beveled pinion-wheel, c, that turns freely around a fixed shaft, c$^1$, that projects from the block G'. To this pinion-wheel c a sprocket-wheel, c$^2$, is secured, over which passes a chain-band, d, that proceeds forward and passes over a sprocket-wheel, d', that is keyed on the inner end of the axle of the main driving-wheels A A$^1$, as shown in Figs. 1 and 6. The sprocket-wheel d' may be attached directly to the wheel A. By these means the crown-wheel H receives a continuous rotary motion when the machine is moving forward. On top of the crown-wheel four elevations, e e e e, in the form of segments, are cast, leaving radial spaces between them for the reception of the hinging ends of the rake and gathering arms, as shown in Fig. 3. Each segment e has two depressions formed in it, which are for receiving the pins f f, that form the pivots for the rake and reel arms, which pins are held down in their places by means of segment-caps e', that are bolted upon the segments e.

Metal arms $g$ $g^1$ $g^2$ $g^3$, which are pivoted to the crown-wheel H, as above mentioned, have the rake and reel arms secured to them, as shown in Figs. 1 and 6. The bar $g^3$, by which the rake is connected to the crown-wheel, is bent backward, as shown, from the line of its attachment to the crown-wheel, for the purpose of bringing the rake farther to the rear as it revolves, and thus depositing the gavel farther from the standing grain. The two arms $g$ $g^1$ are connected together by means of extensible rods h, and the two arms $g^2$ $g^3$ are connected together by means of extensible straps or rods h'. The ends of said rods h h' are pivoted to their respective pair of arms, so that the latter can vibrate freely as the crown-wheel is revolved.

It is desired to give two positions to the rake and reel arms as they revolve, so that in moving over the platform the arms shall sweep in a plane parallel to its surface, and then rise so as to assume an upright position while passing around to commence their acting strokes. After the said arms have completed their sweeps over the platform they may rise suddenly; but it is desired to have the arms descend in the arc of a circle as they successively enter the standing grain and pass it back upon the platform.

To effect such movements a curved rail or cam, J, is erected upon the standard G, as shown in Figs. 1, 2, and 6, its acting surface being shaped in such manner as to guide said arms as they rise and as they descend. As this rail or cam J overhangs the outer portion of the crown-wheel H, it will cause the arms to lean toward the platform as they pass around to commence their work. To the outer side of the cam-rail J a spring-fender, J', is secured, which curves round in front, as shown in Figs. 1 and 2, and serves as a bearing and guide for the rake and reel arms as they move around, and affords a chance for said arms to yield should they be subjected to any undue strain which would be liable to impair or derange the working parts. The reel or beating arms L, which sweep around before the rake-arm K, and gather in the grain as it is cut, are provided with adjustable blades L', applied to them, whereby they can be lengthened or shortened, as shown in Fig. 1.

In Fig. 8 the arm L has a blade, L'', applied to it, so that it can be raised or lowered, so as to adapt the machine for low grain which has been beaten down, or which is very short in straw.

The blade L', which is applied to the end of the beater-arm, as shown in Fig. 9, is designed for adapting this arm to reach grain which may overhang the divider or inner side board.

The rake-arm K is connected, by a pivot-joint, i, to its arm $g^3$, as clearly shown in Figs. 10 and 11, so that the rake-teeth can be turned round out of the way, and thrown out of action, as indicated in Fig. 11. I apply a spring-latch, j, to said arm K, which has a handle applied, so that the driver while sitting in the seat B$^4$ can reach over and adjust the arm K as he may desire. This latch is so formed that it will act upon the metal arm $g^3$, and hold the rake-arm firmly in raking position, as shown in Figs. 1 and 10, or in the position shown in Fig. 11.

By thus providing for turning the rake-teeth, the arm thereof can be used at times for gathering in the grain to be cut, and when a sufficient quantity of grain has been cut, the driver can quickly adjust the rake-teeth so as to deliver the gavel from the platform.

This is a very important feature in connection with this class of rakes, especially when the standard of the rake is arranged very low or near the heel of the cutting apparatus.

It will be seen from the above description that I employ sprocket-wheels and a chain for communicating motion from the axle of the transporting-wheels to the revolving crown-wheel, which chain may be run slack, so as to allow of the undulations or rising and falling movements of the finger-beam and raking-attachment, and still keep up a continuous motion of the rake and reel or beater arms around their axis.

When it is desired to run the rake and beater arms faster or slower with respect to the forward movement of the machine, the sprocket-wheels can be removed from their shafts and larger or smaller ones substituted, or those in use shifted so as to bring the small one on the shaft occupied by the large one, and vice versa.

Having thus described my invention, what I claim as new, and desire to secure by Letters Patent, is—

1. The combination of the continuously-revolving crown-wheel, carrying rake and reel arms, with the standard G, as and for the purpose described.

2. The rake attached to the revolving hub or wheel H by means of the bar $g^3$, bent backward from the line of attachment, for the purpose of depositing the gavel farther from the standing grain, substantially as described.

3. The rake and reel arms pivoted at their inner ends to the hub or crown-wheel H by means of the cross heads or bars fitting into suitable cavities in said hub or wheel, substantially as described.

4. The standard G, for supporting the revolving rake and reel, having one leg connected to the platform, and the other leg connected to the drag-bar and straddling the connection between the finger-bar, platform, and drag-bar, substantially as described.

5. The arrangement of the pivoted rake-head K and the angular spring-lever $j\ j$ and rake-arm $g^3$, in the manner and for the purpose described.

6. The spring-guide J', applied to the cam-rail J, substantially as described.

7. The laterally-adjustable blade L', applied to a beater-arm, for the purpose set forth.

8. The vertically-adjustable secondary reel or beater arm L'', in combination with arm L, substantially as described.

JAMES S. MARSH.

Witnesses:
R. T. CAMPBELL,
EDW. SCHAFER.